July 11, 1967

J. H. JUENGST ETAL 3,330,961

PHOTOELECTRIC SKIP DETECTOR FOR USE
WITH A VISCOUS LAYER APPLICATOR
Filed April 15, 1964

JOHN H. JUENGST
ROBERT A. WRIGHT
INVENTORS

BY R. Frank Smith
David P. Ogden

ATTORNEYS

3,330,961
PHOTOELECTRIC SKIP DETECTOR FOR USE WITH A VISCOUS LAYER APPLICATOR
John H. Juengst and Robert A. Wright, Rochester, N.Y.; Mary Jane Juengst, administratrix for John H. Juengst, deceased, assignors to Eastman Kodak Company, Rochester, N.Y., a corporation of New Jersey
Filed Apr. 15, 1964, Ser. No. 359,916
9 Claims. (Cl. 250—219)

ABSTRACT OF THE DISCLOSURE

For use with a viscous layer application system, a skip detector which directs a light beam toward the expected location of the top surface of the viscous layer. If any part of the viscous layer is too thin, a portion of the light impinges on a detector element to provide an error signal.

Figure 1:
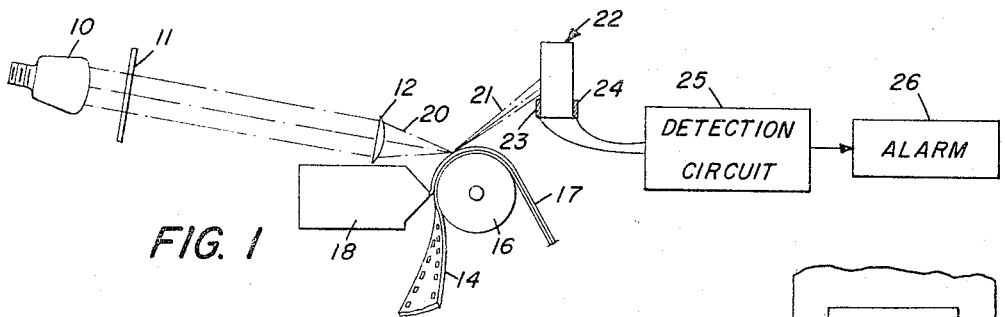

The present invention relates to a fault detector for viscous layer processing and more particularly to photoelectric detecting system for providing an alarm in the event of a substantial failure of a viscous layer being applied to a moving web.

In the art of fault detection many equipments have been developed. Some of these arrangements use a plurality of scanning devices coupled together mechanically and electrically to provide an error signal. The total number of scanning elements is often reduced by making a portion or all of the system movable relative to the material being scanned by a reflected or a transmitted light beam. However, such devices are expensive as a function of the parts necessary. Also, the signal-to-noise ratio is decreased as a function of the number of parallel signals which must be simultaneously evaluated. Because of the complexity of previous systems, there has long existed a need for a very simple system which will accomplish a reliable error signal.

Moreover, many of the prior art devices are inappropriate for the present environment because of the fact that we are working with a relatively narrow web, by way of example, a 35 mm. film, while many prior scanners detect flaws in webs of the order of several feet in width. One example of such a scanner is illustrated in the copending patent 3,206,606 issued Sept. 24, 1965 in the name of Paul A. Burgo et al. and assigned to the assignee of the present invention. Another distinguishing feature between the environment of our invention and that of prior art scanners is that a thickness deviation in the viscous layer is substantial before it is damaging. In other words, a difference in thickness of several thousandths of an inch is necessary to provide detrimental effect to the finished product, while prior art scanners are arranged to detect primarily differences in reflectivity without substantial differences in thickness.

Therefore, an object of the present invention is to provide a simple and reliable fault detector for viscous layer processing.

In accordance with one environment of our invention a 35 mm. film or the like is processed by the application to the emulsion surface thereof a series of developing viscous fluids. The fluids being used have a consistency similar to that of warm tar or honey and under optimum operating conditions are applied thereto in a thickness several times that of the film itself. In applying a viscous layer to a film having a thickness of about .003 inch, the viscous layer thickness is about .012 inch and contains chemicals which operate on the image-forming salts within the film during the residence of the viscous layer thereon. After a predetermined time, a first viscous layer is washed off and a second viscous layer, which may be a fixing fluid, is applied to again be washed off. As necessary, other fluids will be applied depending on the particular developing process necessary for the film being processed. Each of the viscous layer applying portions of the processor includes a fault detector in accordance with our invention.

One embodiment of our invention utilizes a roller over which the film is passed immediately after the viscous layer is applied to its outer surface. A beam of light is directed toward the viscous layer at a low angle of approach and is reflected from the outer surface of the viscous layer on the film. The reflected light beam is in a general direction of the detecting device such as an Ektron photodetector. When the thickness of the viscous layer is consistently of the magnitude required, the beam is reflected above the detector. Should a substantial portion of the viscous layer be less than that required for the particular developing process step, the light will be reflected at a lower angle and will thereby engage the detector to provide an alarm signal.

Figure 3:
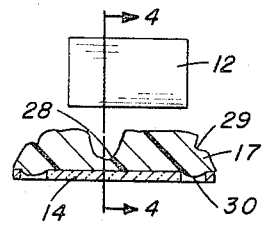
Figure 4:
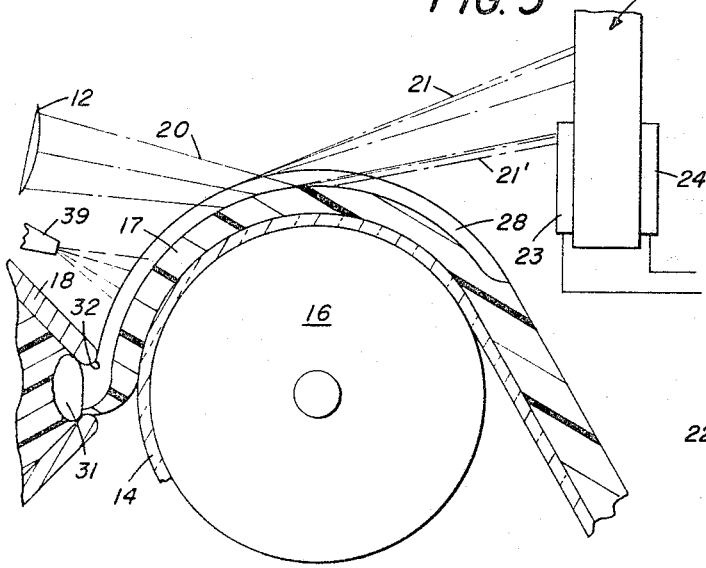
Figure 2:
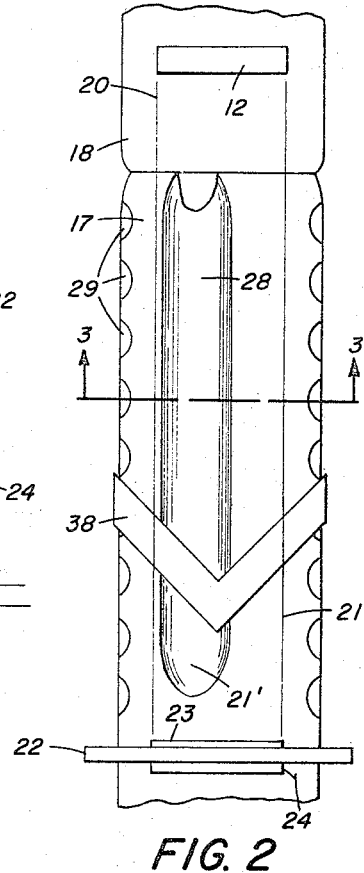
Figure 5:
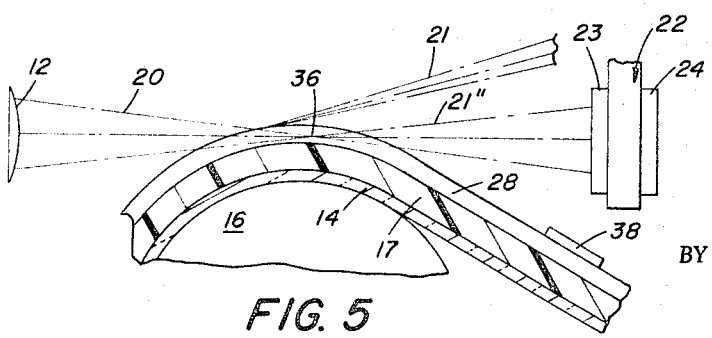

The subject matter which is regarded as our invention is particularly pointed out and distinctly claimed in the concluding portion of this specification. The invention, however, as to its organization and operation together with further objects and advantages thereof, will best be understood by reference to the following description taken in connection with the accompanying drawing, in which:

FIG. 1 is a simplified elevation view;
FIG. 2 is an enlarged top plan view of a portion of the equipment illustrated in FIG. 1;
FIG. 3 is a cross section view taken along the line 3—3 of FIG. 2;
FIG. 4 is a cross section view taken along line 4—4 of FIG. 3; and
FIG. 5 is a view similar to that of FIG. 4 illustrating another embodiment.

Referring now to the drawing, wherein like numbers refer to similar parts, we have shown in FIG. 1 a lamp 10 providing light flux through a filter 11 and a lens 12. The lamp may be a No. 1209 marketed by the General Electric Company, and the filter 11 may be a Wratten Filter referred to as 87C which blocks all light other than infrared light to reduce to a minimum problems of exposing a filmstrip 14. The filmstrip 14 is being passed over a curved surface shown as a roller 16 with its emulsion on the outer surface thereof and receives thereon a viscous layer 17 from a nozzle 18. The lens 12 is preferably a condensing cylinder type which develops a light beam 20 having a very narrow slit or line cross section near the surface of the roller 16.

As shown in FIGS. 1 and 4, the coverging light beam 20 impinges upon the top surface of the viscous layer 17 and is reflected as a beam 21 when no fault is present. The angle of incidence of the light beam is small, such as 5°, so that slight changes in thickness of the viscous layer will result in substantial change of the angle of the reflected beam. This amplification of the reflection change, compared to the thickness change of the layer 17 is further enhanced by the curvature thereof. Thus, the reflected beam 21' is at a slightly lower angle than the beam 21. The lens 12 is effective to condense the light beam 20 so that it impinges upon only a narrow tangential portion of the surface of the viscous fluid 17 whereby the reflected beam 21 is also of narrow dimension.

The reflected light beam 21 passes to the region of a detector 22 so that it misses an Ektron photodetector 23 positioned thereon. We prefer that the Ektron detector be long enough to receive light flux from a region corresponding to the entire width of the image forming, or image containing, area of the filmstrip 14 and be narrow so that it does not extend into the region receptive of the light beam 21. For 35 mm. film a cell 1 mm. by 25 mm. mounted horizontally will operate in this manner. In the event that the image forming area of another type of filmstrip is about 50 mm., two detectors may be placed end to end and coupled in parallel electronically. Another Ektron photodetector 24 is positioned near the detector 23 to be subject to the same conditions of temperature, humidity and aging.

The detectors 23 and 24 are coupled to a detection circuit 25 which is arranged to provide an error signal to energize an alarm 26 whenever the detector 23 is activated by a substantial portion of the light beam 21' (FIG. 4) because of the curvature of the peripheral surface of the viscous layer 17, the converging of the light beam 20 tends to be reflected as a diverging beam 21. However, this surface is not reliably smooth so that some scattering will result. We prefer to place the detector 22 as close to the point of impingement as is feasible and therefore to make the radius of the roller 16 as large as feasible for the film strips 14 being processed. Thus, we recommend that the length of the reflected beams 21 and 21' be no more than 1.5 inches maximum.

As shown more clearly in FIG. 2, a fault is occurring whereby a trough 28 is present in the surface of the viscous fluid 17. This trough 28 is of substantial width as indicated in FIGS. 2 and 3 of substantial depth as shown in FIGS. 3–5. Such a trough 28 is of sufficient magnitude to reduce the quantity of chemicals available for processing the film 14 so that a density variation streak may occur thereon. FIGS. 2 and 3 also illustrate slight serrations 29 developed by the viscous fluid 17 settling into the perforations 30 of the filmstrip 14 (FIG. 3).

As shown more clearly in FIG. 4, the conversing of the light beam 20 from the lens 12 and its angle of approach are selected so that such a trough 28 will lower a portion of the reflected beam 21'. The lowered beam 21' impinges upon the detector 23. The location of the detector 23 is selected so that the trough 28 will be detected only if it is sufficient to prevent proper coverage of the film 14. When using relatively fluid layers 17, such a trough would be about 3/16" wide and would leave bare a portion of the film surface at the point of detection. Troughs of less dimension will tend to be rapidly filled by the adjacent viscous layer so that no damage would result. When using fluids 17 which flow less, a smaller trough must be detected.

When a damaging trough or hole is present, impingement of the beam 21' energizes the detector 23 and changes its impedance substantially compared to the detector 24. These detectors 23 and 24 are placed in a bridge circuit of types which are well known at this state of the electronic art, to develop a substantial unbalance and thus provide an error signal. Such an error signal is amplified in the detection circuit 25 to energize the alarm 26. As indicated in FIG. 4, the trough 28 is developed by a solid particle 31 which has lodged in the opening 32 of the nozzle 18. Obviously other types of faults might occur such as the fluid becoming too thick or thin or containing a substantial number of air bubbles. Such faults, including the viscous layer 17 being too thin throughout its entire width or having numerous pockets, would provide light flux signals equivalent to that shown at 21' to energize the detector 23.

In FIG. 5 we have shown a slightly different embodiment of our invention wherein the light beam 20 is reflected by the viscous layer 17 only when it is of suitable thickness. When the viscous layer 17 or some portion of it is substantially less than the required thickness, the light beam 20 continues without reflection as a beam 21''. Although this embodiment requires precise location of the focal plane 36 of the light beam where the light beam becomes a line, and a more precise lens 12, it has the advantage that the light beam 21'' is not scattered, absorbed, or otherwise reduced in intensity by reflection. Thus, the detector 23 may be slightly more remote from the roller 16 without serious loss of error signal strength. Also illustrated in FIGS. 2 and 5 is a leveler 38 which is provided to correct for minor discontinuities of the viscous layer 17. However, such a device will not correct for certain serious blockages of the nozzle 18 of the type illustrated causing the trough 28.

While we have shown and described particular embodiments of the present invention, other modifications may occur to those skilled in this art. For instance, the top surface of the viscous layer 17 can be sprayed with a highly reflective coating as at 39 in FIG. 4. Preferably such a coating would be nonmiscible with the layer 17 and would have very high surface tension to enhance attainment of a smooth reflecting surface. We intend by the appended claims to cover all such modifications which do not depart from the true spirit and scope of our invention.

We claim:
1. A device for detecting skips in a layer nominally of at least a predetermined minimum thickness on the surface of a moving web, comprising:
   a member having a convex surface for guiding the moving web in a curved path with the layer on the outer periphery of such path;
   a light source positioned to direct a light beam toward the web on said convex surface for impingement on and for reflection by the outer surface of the layer at a substantially constant angle across the width of the web so long as the thickness thereof is at least equal to said minimum thickness;
   detector means positioned to be receptive of the light beam, only when the layer is of less than said minimum thickness and thus contains a skip; and
   means for indicating the reception of such light by said detector means.
2. The invention of claim 1 wherein:
   said light source develops a beam effective to impinge upon the outer surface throughout the useful width of the web; and
   said detector means has dimensions such that it receives light in response to any skip occurring in the useful width of the web.
3. The invention of claim 1 wherein:
   said light source includes condensing lens means so that the light beam is converging to have a focal plane within the layer so long as it is of said minimum thickness.
4. The invention of claim 1 wherein:
   said light source directs the light beam toward the web to impinge at a low angle of incidence thereby cooperating with the curvature imparted to the layer surface so that a small reduction of thickness of the layer will result in a substantial change in the angle of any reflected light beam.
5. The invention of claim 4 wherein:
   the light beam impinges on the photodetector directly when the layer thickness is less than said minimum thickness.
6. The invention of claim 4 wherein:
   the angle of impingement is selected so that the reduction of thickness of the layer by about .01" or more below said minimum thickness will allow the light beam to pass to said detector means.
7. The invention of claim 1 further comprising:
   a spray means positioned to apply a highly reflective coating on the said outer surface of the layer prior to the impingement of the light beam thereon.
8. A device usable within a photographic processor for detecting skips in a viscous layer of processing material placed on an image-containing photographic filmstrip, the layer nominally being of at least a predetermined minimum thickness, comprising:
   a member having a convex surface for curvilinearly supporting the filmstrip with the viscous layer on the outer surface of the filmstrip;

a light source for directing a light beam toward the curvilinearly supported filmstrip to impinge at a relatively low angle of incidence on the viscous layer thereon;

a cylindrical condensing lens positioned between said light source and the convex surface member for developing a converging light beam having a focal plane within the viscous layer, said beam being of a width substantially equal to that of the image-containing portion of the filmstrip;

detector means positioned to be responsive to the light beam only when the viscous layer is less than a predetermined thickness thus containing a skip; and means for indicating the reception of such light beam by said detector means.

9. The invention of claim 8 wherein said detector means is positioned to have its longer dimension parallel to the focal plane with the detector means being substantially the same length as the width of the image-containing portion.

References Cited

UNITED STATES PATENTS

| | | | |
|---|---|---|---|
| 2,503,770 | 4/1950 | Robinson | 250—218 |
| 3,206,606 | 9/1965 | Burgo et al. | 250—219 |

RALPH G. NILSON, *Primary Examiner.*

J. D. WALL, *Assistant Examiner.*